United States Patent [19]

Gilkeson et al.

[11] 4,299,480
[45] Nov. 10, 1981

[54] MIRROR SCANNER SYNCHRONIZED WITH MOVING FOLDED DOCUMENT PLANE

[75] Inventors: David C. Gilkeson, North Oaks; Robert A. Muehlhausen, Maplewood, both of Minn.

[73] Assignee: Minnesota Mining & Manufacturing Company, St. Paul, Minn.

[21] Appl. No.: 183,145

[22] Filed: Sep. 2, 1980

[51] Int. Cl.³ .............................................. G03B 27/70
[52] U.S. Cl. ........................................ 355/66; 355/8; 355/45
[58] Field of Search ............... 355/5, 8, 11, 45, 49, 355/51, 66

[56] References Cited
U.S. PATENT DOCUMENTS

| | | | |
|---|---|---|---|
| 3,740,137 | 6/1973 | Sato | 355/66 |
| 3,752,573 | 8/1973 | Miller | 355/66 X |
| 3,966,319 | 6/1976 | Lang | 355/66 |
| 3,977,260 | 12/1976 | Mihalik et al. | 355/8 |
| 4,213,690 | 7/1980 | Sugiura et al. | 355/8 |
| 4,213,696 | 7/1980 | Wise | 355/45 |

Primary Examiner—L. T. Hix
Assistant Examiner—W. J. Brady
Attorney, Agent, or Firm—Cruzan Alexander; Donald M. Sell; John C. Barnes

[57] ABSTRACT

An image scanning apparatus for use in a camera or reproduction machine where a mirror reflects the image producing rays by movement relative to the object and image planes and a lens while staying on a plane, during such movement, which is coincident to the perpendicular bisector of an imaginary line connecting corresponding image points on the normal image plane and the folded image plane.

5 Claims, 6 Drawing Figures

MIRROR SCANNER SYNCHRONIZED WITH MOVING FOLDED DOCUMENT PLANE

TECHNICAL FIELD

This invention relates to an improvement in image scanners for use in copiers or cameras and in one aspect to an improved scanning system wherein the image points are scanned and movement of the mirror is synchronized with the moving document plane so image points on the folded document plane correspond with the same points on the normal document plane.

BACKGROUND ART

The art is replete with scanning systems for scanning a light image in order to reproduce the same as in a camera or reproduction machine both of which are generically identified as copiers. In such copiers a photographic lens projects the image either from or to a film plane with a document disposed at the folded document plane at any magnification ratio. In a duplicator the document is a moving photoconductor, be it a drum surface, a belt, or a moving coated receptor sheet. In a camera the document is an original document moving past the exposure aperture on a drum, a belt or transparent support.

Moving mirrors have been used to scan stationary original images to direct segments of the images successively onto the receptor. One such patent is U.S. Pat. No. 3,966,319, issued June 29, 1976 to J. M. Lang. This patent discloses a movable mirror which scane one axis of the image, and the mirror is shifted in opposite directions tranverse to its pivotal axis and is simultaneously rotated about its axis in one direction during a scanning cycle to scan a stationary document. The scan across the Y axis or length dimension of a flat field is controlled and the length of the optical path is maintained constant during the scan. This structure differs from that of the present invention in that the mirror only moves on one side of the optic axis while changing its angle to direct the beam from one side of the flat field "Y" dimension to the other side. Thus this patent does not teach imaging by conventional photographic optics a full flat field (X and Y dimensions), nor does it teach the scanning of a microform image plane by a single mirror scan where the optical path length is changing by the amount given by the expression $$\frac{F + FM}{\cos u'}$$

wherein F = the focal length, M = the enlargement ratio and u' = one-half the flat field angle. Thus the scanning of the image by shifting the mirror along the axis of the reflected ray while rotating it in a single direction to scan the flat plane differs from the idea of moving the mirror along one coordinate and shifting the angular position of the mirror to move the image along the surface of the mirror to scan the image as taught by the invention of applicants.

Other prior art teaches the rotation of a mirror which receives the reflected image from a scanner of a fixed object to merely direct the image to a lens or onto the receptor surface. Other prior art using pivoting mirrors scan curved focal planes, thus compensating for the changes in distances of the image points from the document surface to avoid keystoning or other distortions of the image when reproduced on the receptor.

The present invention provides a method and apparatus for directing image points to or from a film plane from or to a folded plane so corresponding image points on the folded document plane are synchronized with corresponding points on the normal document plane. Various magnifications can be accommodated by merely changing the lens of the system.

BRIEF SUMMARY OF THE INVENTION

The present invention provides a scanning apparatus for use in a copier and particularly for use in a copier having a projected image such as the printer for microfilm images wherein the image is projected from a fixed film plane by conventional photographic optics through an objective lens toward a normal document plane, and the image is scanned by a single mirror where the optical path length is changing by the amount given by the expressions $$\frac{F + FM}{\cos u'}$$

wherein F = the focal length, M the enlargement ratio and u' = one-half the field angle of the lens. The projection apparatus comprises means for projecting the image of the original from the film plane toward a normal document plane, a flat mirror, and means supporting the mirror for movement across the path of the projected image for reflecting points or segments of said image onto a folded document plane which is moving at a rate synchronized to that of the mirror to place corresponding image points on the document plane. The mirror is moved across the projected image and is maintained on the perpendicular bisector of an imaginary line connecting the image point on the folded document plane where the reflected image is received and the corresponding point for the projected image on the normal document plane. Another way of describing the mirror position is that the mirror is maintained in a plane at an angle to the optic axis which angle θ equals $$\operatorname{Tan}^{-1}\left[\frac{S - \frac{L}{2} - (B - C)\cos\alpha}{A - C}\right] - 90°$$

wherein S equals the distance from one end of the image measured on the image plane to the segment, L equals the length of the image, A equals the distance along the optic axis of the image to a line perpendicular to the optic axis and passing through the mask or exposure aperture to the folded document plane for receiving the reflected image, B equals the distance along the optic axis to the point of intersection with the desired reflected optic axis, and C equals the distance along the optic axis to the normal document plane. Angle β equals the angle between the incident optic axis and the desired reflected optic axis and α is the angle in the imaginary triangle between the reflected optic axis and the line perpendicular to the optic axis of the lens through point (0,A) as illustrated in the drawings.

In a camera the object would be on a document moving past the mask or exposure aperture adjacent the folded document plane. The document would be illuminated on this plane. The moving mirror, between the normal document plane (placed at the long conjugate of the lens) and the lens, is synchronized with the moving folded document plane to place corresponding image points on the document on a film on the fixed film plane (placed at the short conjugate of the lens).

The parameters for controlling the position of the mirror with respect to the projected image can be maintained by various linkage and cam systems, three of which are disclosed.

A first embodiment controls the mirror position by means of a cam follower connected to the mirror and a cam which is driven in conjunction with the rotation of the image receptor. The mirror is mounted on a carriage which travels on a "Y" axis and is moved by a cam rotating with the cam which rotates the mirror. The cam radii for translating the carriage and for rotating the mirror can be found by solving the mirror line equation for "Y" where "X" equals "0" and resolving the mirror angle equation for a series of the distances S to the scanned segment ranging from 0 to the length (L) of the image.

In a second embodiment the mirror is supported on an arm which is controlled by a slide which moves the mirror support member with respect to the folded document plane. The mirror is supported on an arm which slides relative to a point coaxial with the position on the drum defining the folded document plane, and is moved on that slide by a follower which moves in a plane parallel to that of the normal document plane.

In the third embodiment, the mirror is pivoted about a point corresponding to the position on the drum for receiving the image segment. The slope of the mirror is controlled by a pair of links which maintain the mirror on the perpendicular bisector of a line joining the pivot point with a point on the flat normal or direct image plane where the predetermined projected image point would fall.

BRIEF DESCRIPTION OF THE ACCOMPANYING DRAWING

The present invention will be described in greater detail with reference to the accompanying drawing wherein.

DETAILED DESCRIPTION OF THE PRESENT INVENTION

This invention provides a novel system for folding the light path of a scanned image and is adapted for use in a camera or projector, i.e. a photographic apparatus generally designated as a copier. A projected image may be scanned by the mirror to transfer image points onto corresponding points on the folded document plane on which is a light sensitive document, such as a drum having a photoconductor coated thereon, a belt having a photoconductive surface, a receptor sheet having a light sensitive coating etc. The present invention affords a novel structure for scanning the projected image from a microfilm, which microfilm has individual frames which are magnified to be reproduced in an enlarged scale on the document. In reproducing projected microfilm images the mere rotation of a mirror positioned on the optic axis to receive the image and reflect the same onto a screen or print paper on a flat plane produces a distorted image. Distortion results because of the difference in distances between the center and edges of the image as the mirror pivots or the image is keystoned enlarging and compressing portions of such image.

The present invention provides a means for directing image points synchronously to accurately reproduce the image through a full field angle by conventional photographic optics from a fixed film plane by a single mirror scan where the optical path length is changing by the amount given by the expression $$\frac{F + FM}{\cos u'}$$

wherein F equals the focal length, M the enlargement ratio, and u′ equals one-half the field angle of the lens. To maintain the mirror at the proper angle to reflect all the image points to the folded document plane through the slit or aperture in the mask forming the shutter for the folded document plane and to maintain the optical path length of each ray or image point equal during the scanning of the image, the slope and position of the mirror is geometrically defined during the scan movement.

Figure 1:
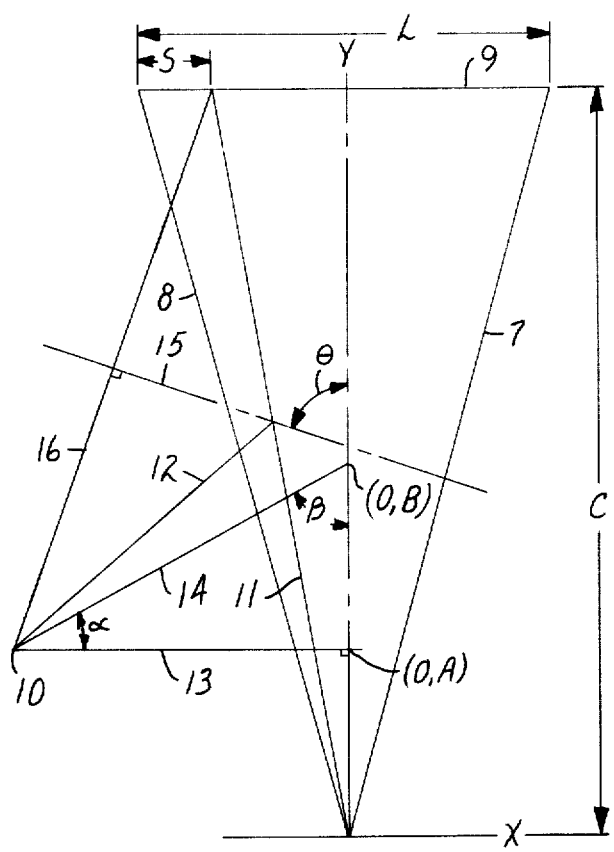
FIG. 1 is a schematic layout showing the relationship of the segments of the scanning apparatus with respect to one another.

Referring now to FIG. 1 the geometric relationship of the parts is defined to perform the scanning operation in accordance with the present invention. In FIG. 1, the "X" and "Y" axes are drawn, the X axis being the line parallel to the direct image plane of the projected image cone as represented by the lines 7 and 8 which image projects from a vertex or point on the graph where X and Y equal 0 being the lens aperture stop or light cone vertex and the Y axis being the optic axis for the lens or projected image as illustrated. The image is projected to a normal document plane or flat, direct object plane in a projector, which plane is represented by the line 9. The image is to be reflected through an exposure aperture or slit 10 in a shutter adjacent the folded document plane supporting a photoconductive receptor which may be the drum of a copy machine, an endless belt, or a sheet upon which the image is to be formed. In the camera this would be the support for the original or the object. The copying process may conform to a number of known copy processes wherein the folded document plane is moving in correspondence with the movement of the image scanner to reproduce the image. Also in FIG. 1 the length of the image on the normal document plane 9 is equal to L and the plane 9 is spaced from the axis X a distance C, thus the coordinates for the ends of the image on the flat image plane are (−(L/2), C) and (+(L/2), C). The position of the exposure slit 10 with respect to the optic axis Y is such that the coordinates of the slit are (B−C) cos α, and A. A is the point on the Y axis where a line 13 perpendicular to the Y axis and connecting the slit 10 intersect with the Y axis. The point of intersection between the incident ray and the reflected ray have the coordinates (0, B) when the incident ray is on the Y axis. The sum of the length of the incident ray 11 and the reflected ray 12 of a specific image point of the projected image, which segment is spaced a distance S from one end of the image on the normal document plane, will at all times be equal during the scanning of the image to the length of the ray directly to the normal document plane. As an example, when $\beta$ is equal to 90° and B=A and when S equals one-half of the print length L or when S equals L/2, the mirror, represented by the reference numeral 15, should be positioned at an angle of 45 degrees with respect to the Y axis. Angle $\beta$ equals the angle between the incident optic axis and the desired reflected axis 14 of the image in the system, when the angle of incidence equals the angle of reflection, for a desired setup of the mirror, lens and slit. The angle $\alpha$ is the angle between the reflected ray 14 and perpendicular line 13 through point (0,A). The mirror angle relative to the X axis would at any point equal $$\text{TAN}^{-1}\left[\frac{S - \frac{L}{2} - (B - C)\cos\alpha}{A - C}\right]$$

The slope of the plane for the mirror can also be determined by finding the slope of the line 16 connecting the position of the incident ray on the flat image plane 9 with the slit 10. This slope m for the line 16 for an incident ray is found by solving the equation for the coordinates, thus this slope equals $$\frac{C - A}{S - \frac{L}{2} - (B - C)\cos\alpha}.$$

The slope of the mirror then would equal $$-\frac{1}{m} = \frac{S - \frac{L}{2} - (B - C)\cos\alpha}{A - C}$$

and the solution finds that the mirror line is geometrically defined as the perpendicular bisector of the line 16 which is the line from the slit 10 to the point where the incident ray meets the flat image plane. The instant reflection point (X, Y) of the mirror can be found by simultaneous solution of the mirror line i.e.

$$y - \frac{A + C}{2} = $$
$$\left(\frac{S - \frac{L}{2} - (B - C)\cos\alpha}{A - C}\right)\left(x - \frac{S - \frac{L}{2} + (B - C)\cos\alpha}{2}\right)$$

and the incident ray line equations where the incident ray line equals $$y = \left(\frac{C}{S - \frac{L}{2}}\right) x$$

Thus as the mirror is moved through the image defined by the cone 7, 8 the slope of the mirror 15 must change as the slope of the line 16 changes and the length of S increases, and further, the distance to the point of intersection of the incident ray with the mirror changes as the mirror moves through the image. Having determined that the mirror must remain on the perpendicular bisector of the line from the folded document plane to the point where the incident ray would meet the normal document plane 9 the mirror may be mechanically moved to afford a continuous scanning of the image and directing those sequential image points through the aperture 10 to the folded document plane behind the mask. Various mechanical structures can be used to perform the mechanical movement of the mirror such that, at all points the mirror is at the proper slope and position to effect a constant image distance while maintaining the exact length of each ray path from the vertex of the light image of the lens to the folded document plane and afford movement of the mirror in synchronism with movement of the folded document plane. Whatever the structure, it should be such as to allow free movement and avoid vibration or chatter.

Figure 2:
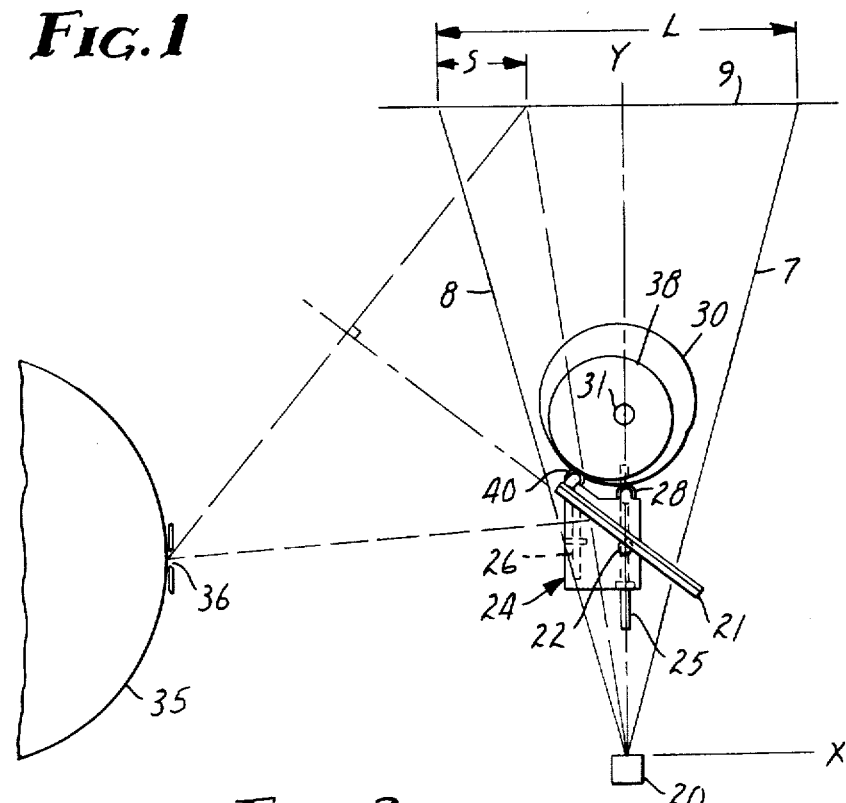
FIG. 2 is a schematic drawing of one support means for the mirror of the scanning system constructed according to the present invention.

Referring now to the embodiment illustrated in FIG. 2, a projection lens 20 is shown for projecting a light image 7, 8 toward a normal document plane 9. The lens 20 is interchangeable with lenses of different magnification or it could have variable magnification. The light image is intercepted by a mirror 21 pivotally supported by a shaft 22 mounted on a carriage 24. The mirror 21 can be long enough to intercept the entire image and project the whole field onto a screen prior to recording the image or the mirror can be a beam splitter to afford projection of the entire image for viewing on the normal document or object plane and for folding the light path. The carriage 24 is mounted on two slide rods 25 and 26 with the slide rod 25 positioned parallel to the optic axis and with the center of the shaft 22 disposed perpendicular to the axis. A cam follower 28 mounted on the carriage controls the movement of the carriage 24 along the slide rods 25 and 26. Cam follower 28 engages a cam 30 driven about a fixed shaft 31 to correspond with the rotation of a drum 35 supporting the photoconductor and positioned past the slit 36 receiving the image segments. A second cam 38 is driven with the cam 30 and a cam follower 40, secured to the mirror 21, positions the mirror at varying angles during the movement of the carriage 24 along the slide bars 25 and 26. The cams 30 and 38 rotate together along with the shaft 31, and one rotation of the cams occurs per rotation of the photoconductor on the drum 35. The cam radii can be found by solving the mirror angle equation for Y with X equaling 0 and solving the mirror angle equation, both for a series of scans (S) ranging from −(L/2) to +(L/2).

Figure 3:
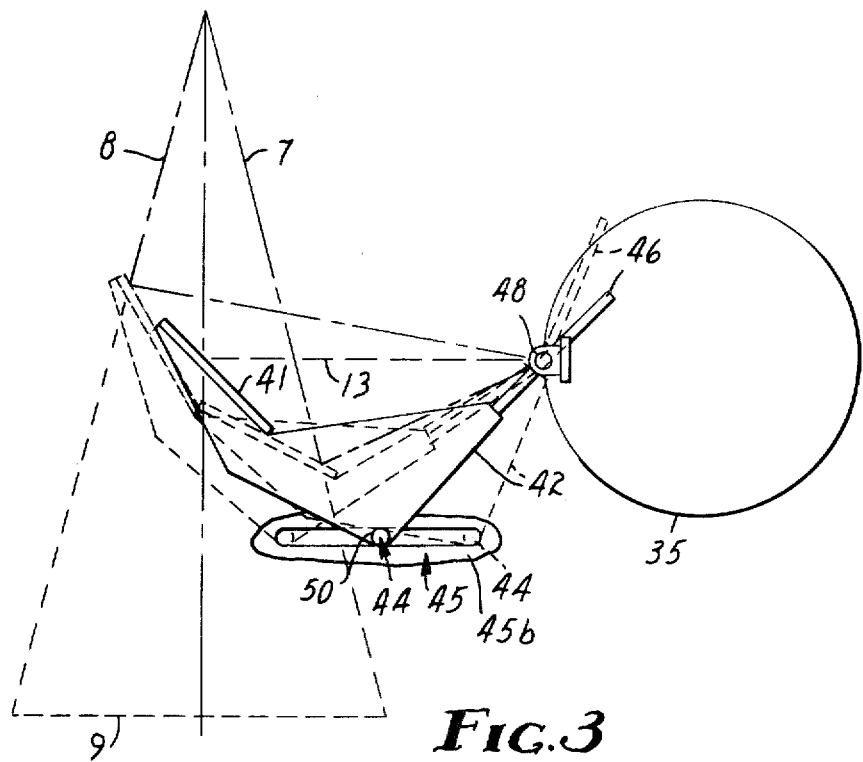
FIG. 3 is a schematic diagram of a second embodiment of a scan apparatus constructed in accordance with the present invention.

Referring now to FIG. 3, a second embodiment of a structure for supporting a mirror 41 is illustrated including a bracket 42 of generally L shape which is secured by a point in the plane of the mirror to a follower 44 riding on a slide bar 45, to move the point on the arm in a horizontal path. The slide bar 45 is positioned at a distance equal to (C-A/2) i.e. one-half the distance between the perpendicular line 13 and the normal document plane 9. The mirror 41 is cantilever mounted on the bracket 42. The end of the bracket 42 opposite the mirror 41 is provided with a smooth rod 46 which slidably engages a yoke 48 which is mounted to rotate about an axis coextensive with the shutter slit 36 as the position or angle of the rod 46 changes with respect to the plane including the slit. Wherefore, with this construction, the follower 44 is moved along the bar 45 in syncronism with the movement of the receptor behind the slit to move the mirror across the image cone 7, 8 to scan the image and impart it to the receptor.

Figure 4:
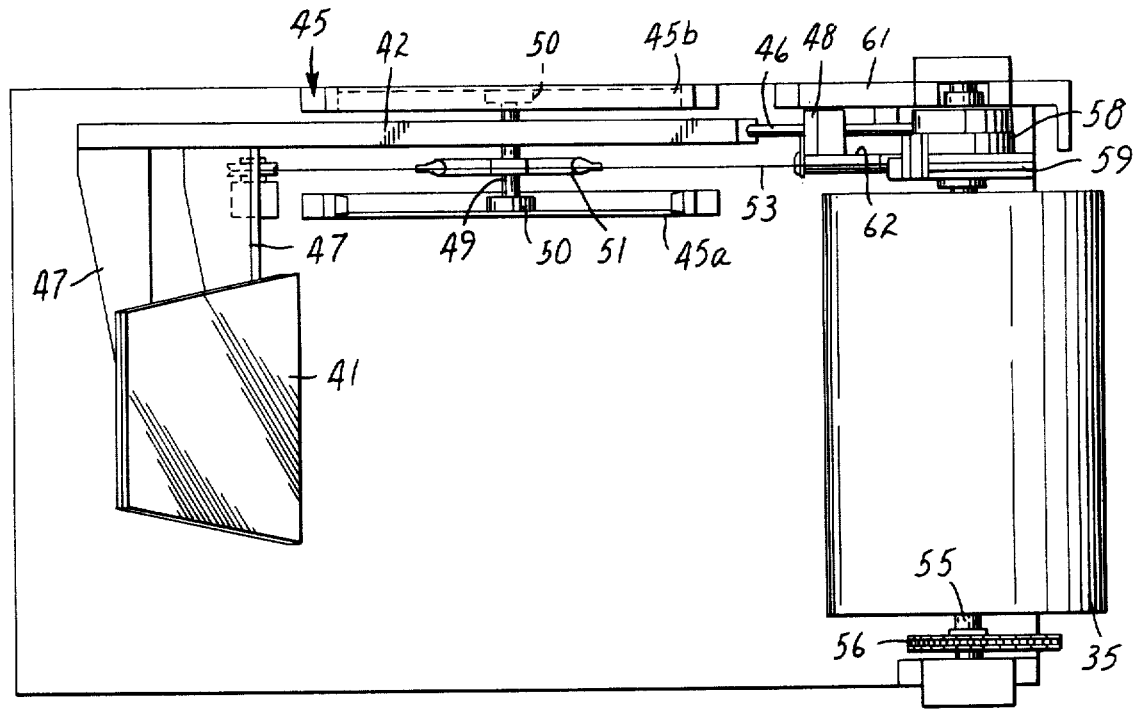
FIG. 4 is a plan view of an apparatus constructed according to FIG. 3 illustrating the structure and scan synchronizing system.
Figure 5:
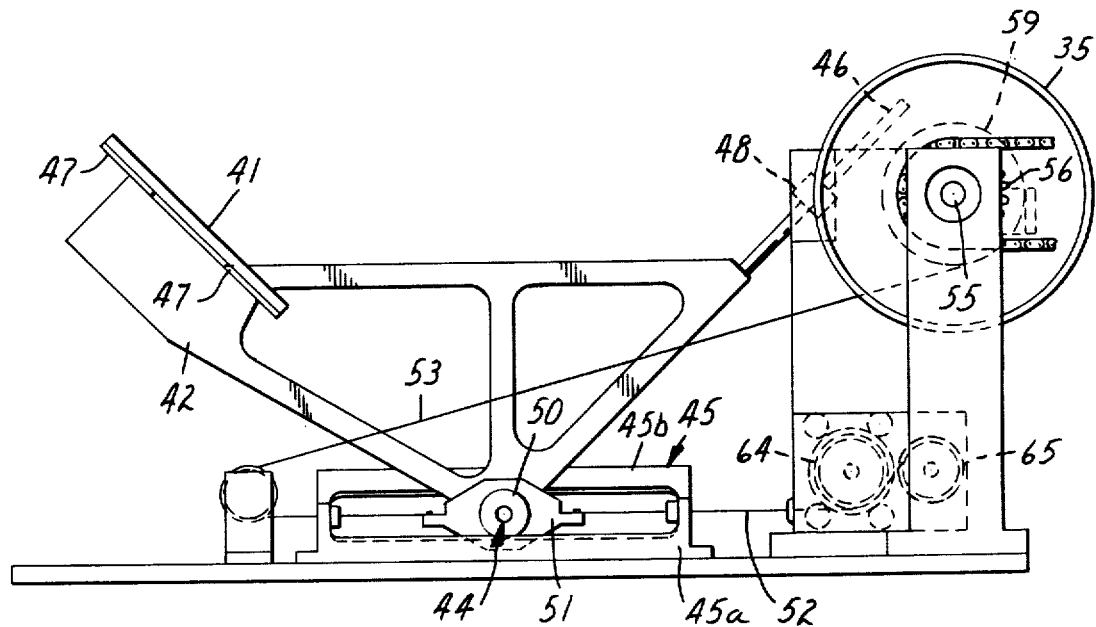
FIG. 5 is a side elevational view of the apparatus of FIG. 4.

The apparatus for affording the synchronous movement between the mirror 41 and the drum defining the folded document plane is illustrated in FIGS. 4 and 5. The mirror 41 is supported on a pair of arms 47 extending from the bracket 42. The bracket 42 is pivotally mounted on a follower 44 which comprises a shaft 49 extending through the bracket 42 and having rollers 50 journalled on its outer ends. Supported also on the shaft 49 is an anchor 51 to which a cable 52 and a cable 53 are attached As hereinafter explained, the cables 52 and 53 will afford movement of the anchor 51 carrying the bracket 42 along the slide bar 45 which is defined by a pair of fixed members 45A and 45B which support the rollers 50.

The drum 35 is rotatably mounted on an axis defined by stub shafts 55. The shaft 55 at one end of the drum supports a belt sprocket 56 which affords a driving connection between the drum 35 and the drive means. At the opposite end of the drum 35 is an electromagnetic clutch 58 carried on shaft 55 which engages the pulley 59 upon which the cable 53 is wound such that the pulley 59 will rotate with the drum and cable 53 will be wound upon the pulley 59. The pulley 59 has a circumference equal to ½ the circumference of the drum 35 to afford movement of the bracket 42 along members 45A and 45B at a rate ½ the speed of the drum surface. As the bracket 42 and the mirror 41 moves, the bracket pivots on the axis of the shaft 49 as the rod 46, attached to bracket 42, moves through the yoke 48, which yoke has pivotal movement on an axis transverse to the rod 46 in relationship to the frame members 61 and 62.

Cable 52 is wound on a drum 64 biased by a spring motor 65 to maintain the cable 52 under tension and wound on the drum 64 bringing the anchor 51 to a normal rest position against one end of the slide bar. When an image is projected toward the mirror or an original moved about the drum and toward the scan aperture, the clutch 58 is engaged. The cable 53 then pulls the anchor 51 across the slide bar 45 until it hits a switch (not shown) to disengage the clutch and the mirror returns to its normal position under the force of motor 65.

Figure 6:
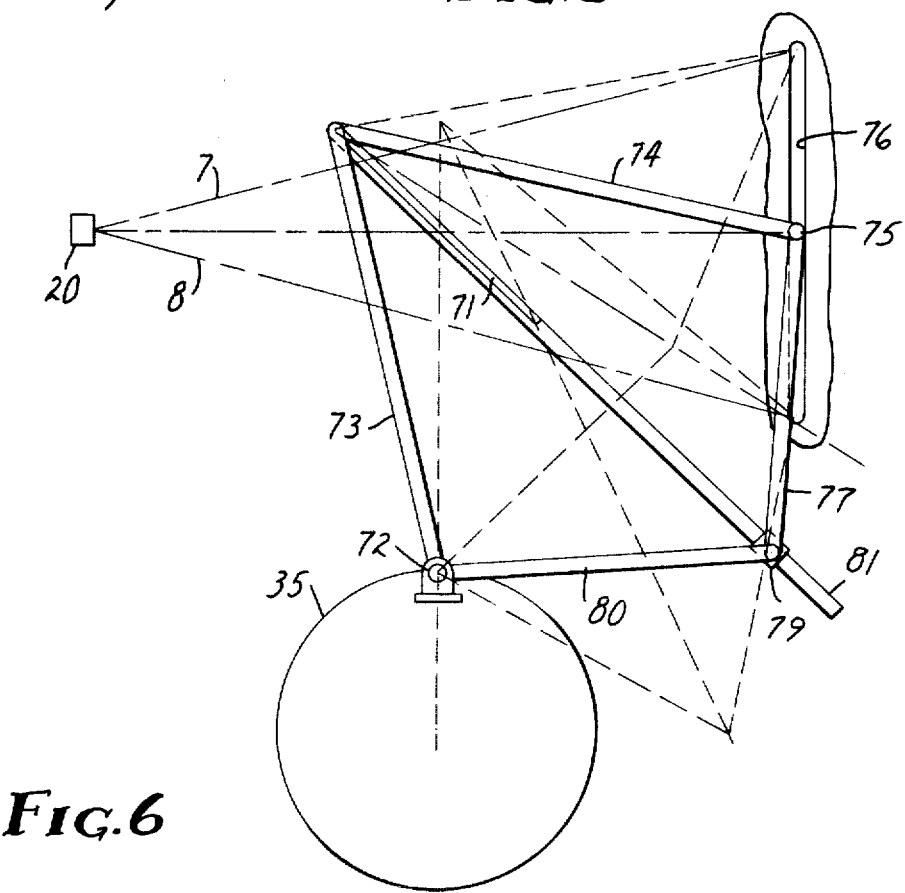
FIG. 6 is a schematic diagram of the scan apparatus constructed in accordance with the present invention showing a third embodiment thereof.

Referring now to FIG. 6, a further embodiment is illustrated wherein a mirror 71 is pivoted about an axis of a shaft 72 which axis is coextensive with the aperture of a shutter masking the folded document plane positioning a photoconductor on the drum 35. As the mirror 71 is pivoted about the axis of shaft 72, the position of the mirror along the optic axis of the lens is also changing as one end of the mirror is moved toward and away from the lens 20. In this structure a scissors linkage comprising four pivoted links positions the mirror on the perpendicular bisector of the line between the center of the aperture of the folded document plane and the image point on the normal document plane. The links include a link 73 connecting the mirror to the shaft 72, link 74 connecting the mirror to a pivot pin 75 which moves along a path coincident with the normal document plane 9 by means of a guide pin following a channel 76, a third bar 77 connecting the pin 75 to a slide collar 79 and a final link 80 connecting the slide collar 79 to the shaft 72. The slide collar 79 slides freely on a rod 81 disposed in the plane of the mirror and extending that plane. Thus as the guide pin at point 75 moves along the channel 76 the linkages 73, 74, 77 and 80 affords a rotational movement of the mirror about the axis of shaft 72 and relative to the lens axis such that the image segments are reflected by the mirror toward or from the aperture near the drum 35 defining the folded document plane.

Having described the invention with reference to several embodiments for carrying out the invention, it will be appreciated that further details known to one skilled in the art are required and that changes may be made in the structures illustrated without departing from the invention as set out in the appended claims.

I claim:

1. An image scanning apparatus for use in an image projecting device for receiving and reflecting continuous scanned image points, said apparatus comprising:

lens means for projecting an image and having a normal object and a normal image plane, a flat mirror, means supporting said mirror in the optical path of said lens means for reflecting said image points between a normal image plane and a folded image plane, said means supporting said mirror including means for moving said mirror relative to said object and said image planes, and relative to said lens means for maintaining the plane of the mirror on the perpendicular bisector of an imaginary line connecting the image points on the normal image plane with the corresponding points on the folded image plane and for supporting said mirror reflecting surface at a distance such that the sum of the incident ray and reflected ray of an image point will equal the length of the ray for the image point from the lens means to the position of the corresponding image point on said normal image plane; and means for synchronizing the movement of said mirror and the movement of the folded image plane to maintain said mirror in the proper plane for each image point on the folded image plane.

2. A scanning apparatus according to claim 1 wherein said plane of the mirror is at an angle ($\theta$) to the optic axis of the image which equals $$\mathrm{Tan}^{-1}\left[\frac{S - L/2 - (B - C)\cos\alpha}{A - C}\right] - 90°$$

wherein S equals the distance from one end of the image measured on the normal image plane to the image point, L equals the length of the image on the normal image plane, A equals the distance along the optic axis from the vertex of the lens field to an imaginary line perpendicular to the optic axis passing through the image point on the folded image plane, B equals the distance along the optic axis to the point of intersection of the mirror and the image point, C equals the distance along the optic axis to the normal image plane and $\alpha$ equals the angle between the reflected ray and said line perpendicular to the optic axis and intersecting the image point on the folded image plane.

3. An image scanning apparatus for use in an imaging device having a lens, a normal image plane of the lens, a folded image plane afforded by a flat mirror and an exposure aperture forming a light mask for the folded image plane comprising:

means for supporting said flat mirror, said means supporting said mirror including means to movably support said mirror in the path of the image points within the angle of field of said lens for reflecting said image points between said normal image plane and said folded image plane and for maintaining the plane of the mirror on the perpendicular bisector of an imaginary line connecting an image point at the exposure aperture and the corresponding image point on said normal image plane, and means for supporting said mirror reflecting surface at a distance such that the sum of the incident ray and reflected ray of a said image point will equal the length of the ray for the same image point from the vertex of the image cone to the position of the corresponding image point on said normal image plane.

4. An image scanning apparatus according to claim 1 or claim 3 wherein said means supporting said mirror along said perpendicular bisector maintains a movement such that the change in the optical path length is given by the expression $$\frac{F + FM}{\cos u'}$$

wherein $F$ = the focal length, $M$ the enlargement ratio and $u'$ = one-half the field angle of the lens.

5. An image scanning apparatus according to claim 2 wherein the mirror angle $\theta$ relative to the optic axis of the lens at any point is equal to $$\mathrm{Tan}^{-1}\left[\frac{S - L/2 - (B - C)\cos \alpha}{A - C}\right] - 90°$$

wherein S equals the distance from one end of the image measured on the normal image plane to the image point, L equals the length of the image on the normal image plane, A equals the distance along the optic axis of the image to a line perpendicular to the optic axis and passing through the image point on the folded image plane, B equals the distance along the optic axis to the point of intersection with the ray of the image point, C equals the distance along the optic axis to the normal document plane, and $\alpha$ is the angle between the reflected ray and said line perpendicular to the optic axis.

* * * * *